United States Patent

Clapper et al.

(10) Patent No.: US 7,990,469 B2
(45) Date of Patent: Aug. 2, 2011

(54) CLEANING FRIENDLY CAMERA PRIVACY FEATURE

(75) Inventors: Edward O. Clapper, Tempe, AZ (US); Tommy S. Montoya, Portland, OR (US); Mark Perusich, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1193 days.

(21) Appl. No.: 11/711,556

(22) Filed: Feb. 26, 2007

(65) Prior Publication Data

US 2010/0309359 A1    Dec. 9, 2010

(51) Int. Cl.
*H04N 5/225* (2006.01)

(52) U.S. Cl. ...................................... 348/374

(58) Field of Classification Search .................. 348/374; 359/511; 396/448
See application file for complete search history.

(56) References Cited

U.S. PATENT DOCUMENTS

| 5,406,413 | A  | * | 4/1995 | Mogamiya | 359/511 |
| 7,800,682 | B2 | * | 9/2010 | Nagamine et al. | 348/335 |
| 2004/0120552 | A1 | * | 6/2004 | Borngraber et al. | 382/115 |
| 2007/0081821 | A1 | * | 4/2007 | Izumi et al. | 396/448 |

* cited by examiner

*Primary Examiner* — James M Hannett
(74) *Attorney, Agent, or Firm* — Cool Patent, P.C.; Kenneth J. Cool; Joseph P. Curtin

(57) ABSTRACT

Briefly, in accordance with one or more embodiments, an appliance having a camera and camera window may include a shutter puck slidably disposed in a slot in which the camera window may be disposed. The puck may have a wiper pad that is capable of cleaning the camera window as the puck is slid within the slot from a camera on to a camera off or privacy position. The puck may comprise an at least partially deformable material so that the puck may be inserted into and/or removed from the slot by at least partially deforming the puck to allow the puck to be installed in or extracted from the slot. The puck may further include a grip rib structure or the like to allow a user to grasp the puck and slide the puck within the slot.

20 Claims, 3 Drawing Sheets

PUCK REMOVAL/ REPLACEMENT

CLEANING ACCESSIBILITY

CLEANING FRIENDLY CAMERA PRIVACY FEATURE

BACKGROUND

In health-related appliances or other similar devices having integrated cameras, it may be desirable to provide a user-controllable privacy option to turn off the camera, for example, during discrete moments. Such appliances may be amenable both to routine cleaning by the user as well as more extensive cleaning, for example, when the appliance is refurbished for a new user. The home environment typically may lead to the collection of dust, vaporous substances, and so on, that may be deposited, for example, in deep or narrow crevices of the appliances, which potentially may provide constraints or limitations on the physical design of health appliances. Complex or overly sophisticated solutions for such issues may be impractical for in home-health applications.

DESCRIPTION OF THE DRAWING FIGURES

Claimed subject matter is particularly pointed out and distinctly claimed in the concluding portion of the specification. Such, such subject matter, however, may be understood by reference to the following detailed description when read with the accompanying drawings in which:

Figure 1:
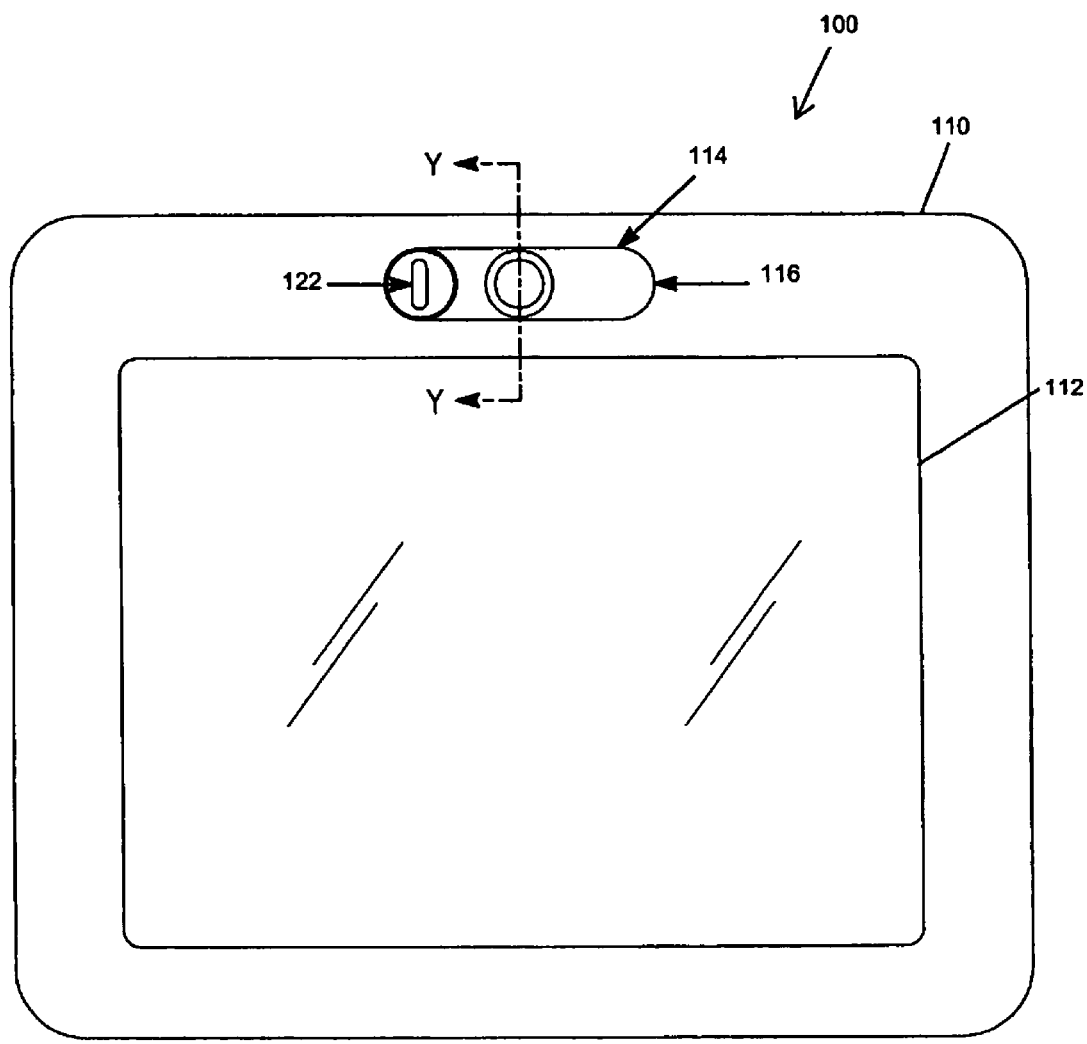
FIG. 1 is an elevation view of an appliance such as a display having a camera window and shutter puck in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Referring now to FIG. 1, an elevation view of an appliance, such as a display having a camera window and shutter puck in accordance with one or more embodiments will be discussed. As shown in FIG. 1, appliance 100 may comprise a housing 110 having a display 112 and a camera window 114 to provide a light-transmissive opening through which a camera 118 may be focused. Display 112 may comprise, for example, a liquid-crystal-type type display (LCD), a plasma-type display, a field-emission-type display, an organic-light-emitting-type display (OLED), and so on. Camera 118 may be disposed in an interior portion of housing 110, as shown, for example, in FIG. 3, and may be capable of focusing and/or otherwise capturing an image through camera window 114, for example, to capture images relating to the operation of appliance 100. In one or more embodiments, appliance 100 may comprise an information-handling system, and/or a display of an information-handling system, capable of providing video-conferencing-type functions, for example, for communication between a patient and a caregiver and/or medical practitioner. Camera window 114 may be disposed in and/or proximate to window slot 116 formed on the housing of apparatus 110. A puck 120 may be slidably disposed in window slot 116 to optionally cover and/or uncover the lens of camera 118. In one or more embodiments, puck 120 may provide a cleaning function for camera window 114. In one or more embodiments, puck 120 may comprise a pliable rubber or other polymer-type material wherein puck 120 may be retained within window slot 116 and further have a freedom of movement to allow puck 120 to slide within window slot 116. In one or more embodiments, puck 120 may be sufficiently rigid so as to be retained within window slot 116 during use and further sufficiently rigid so at to mitigate inadvertent removal and/or expulsion from window slot 116, for example, by a user when the user slides puck 120 within window slot 116, and/or when appliance 100 is moved around from location to location. Likewise, puck 120 may be sufficiently flexible to allow at least a partial deformation of puck 120 for example, for removal of puck 120 from window slot 116 for replacement and/or servicing. These are, however, merely examples of one or more embodiments of puck 120, and the scope of the claimed subject matter is not limited in these respects. A close-up view of the operation of puck 120 is shown in and described with respect to FIG. 2, and side-cutaway views of appliance 100 along cut line Y-Y are shown in and described with respect to FIG. 3 and FIG. 4.

Figure 2:
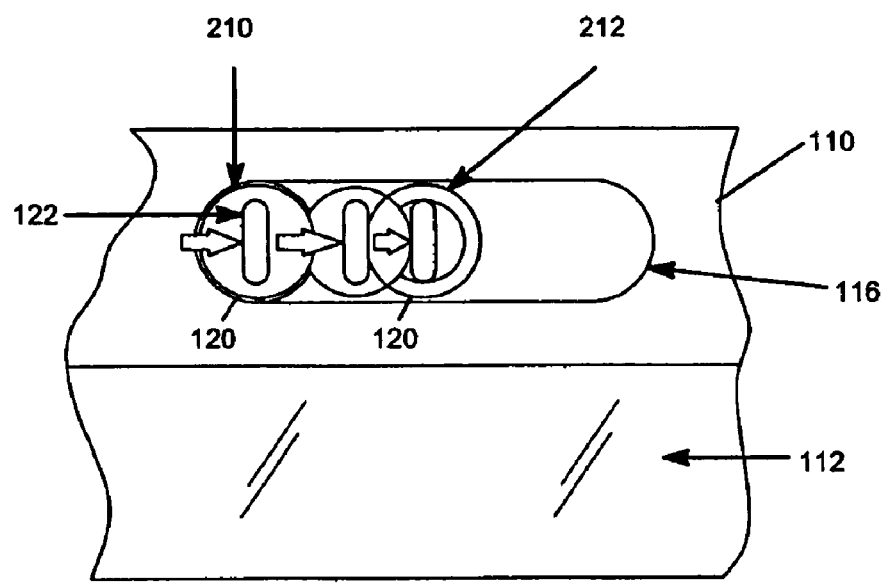
FIG. 2 is a close-up view of the operation of a shutter puck as shown in FIG. 1 in accordance with one or more embodiments.

Referring now to FIG. 2, a close-up view of the operation of a shutter puck as shown in FIG. 1 in accordance with one or more embodiments will be discussed. As shown in FIG. 2, puck 120 may be slidably disposed within window slot 116. When operation of camera 118 is desired, a user may slide puck 120 into position 210 which may be, for example, a camera on position. When operation of camera 118 is not desired, and/or when a user desires privacy from camera 118 while camera 118 is operating, a user may slide puck 120 into position 212 which may be a camera-off position, or a privacy position. In one or more embodiments, puck 120 may be sufficiently sized and/or shaped to cover the lens of camera 118 so that no images and/or a black or nearly black image will be capture by camera 118 while puck 120 is disposed in position 212, for example, even while camera 118 may still be powered on, since puck 120 may block or at least partially block the lens of camera 118. In one or more embodiments, puck 120 optionally may comprise grip rib 122 that may allow a user to grab and/or manipulate puck 120 by grasping grip rib 122. Grip rib 122 is, however, one example structure that may be formed on puck 120 to allow a user to grab and/or manipulate puck 120, and the scope of the claimed subject matter is not limited in this respect.

Figure 3:
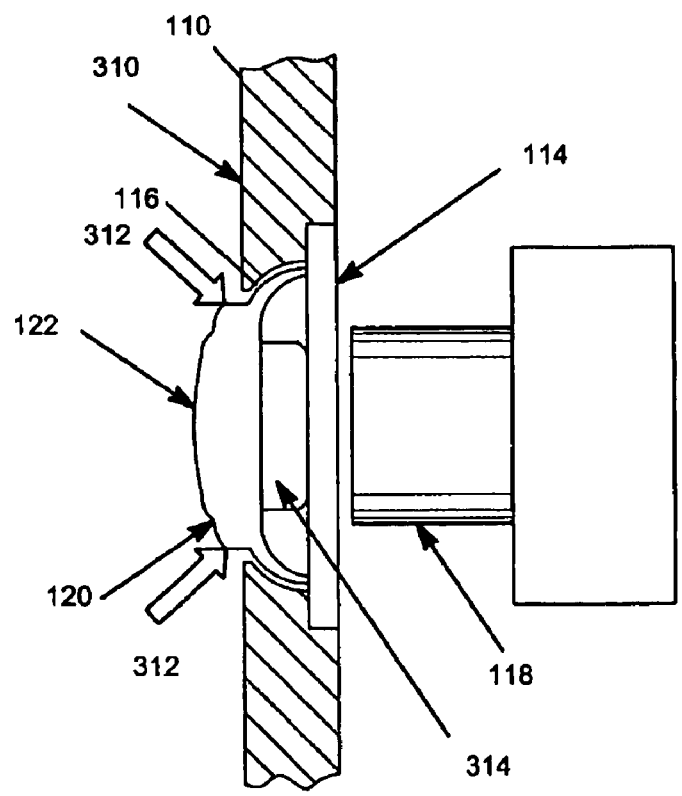
FIG. 3 is a side-cutaway view of an appliance having a camera window and shutter puck of FIG. 1 in accordance with one or more embodiments.

Referring now to FIG. 3, a side-cutaway view of an appliance having a camera window and shutter puck of FIG. 1 in accordance with one or more embodiments will be discussed. In FIG. 3, apparatus 110 may comprise bezel 310, which may function as a bezel for display 112 as shown in FIG. 1. Puck 120 may comprise pad 314, which may be, for example, a soft material, such as a microfiber material or the like. Pad 314 may contact camera window 114 when puck 120 is disposed within window slot 116. In one or more embodiments, pad 314 may not be visible to a user when puck 120 is disposed within window slot 116, and pad 314 may function as a wiper pad to clean camera window 114. When puck 120 is moved along window slot 116, pad 314 may slide across camera window 114 and pick up and/or wipe off dust, fingerprints, and so on that may be disposed on camera window 114, to provide a cleaner camera window 114. Furthermore, in one or more embodiments, puck 120 may be removed at least temporarily, and/or replaced in one or more embodiments. In such embodiments, puck 120 may be at least partially deformed by a user and/or service technician by squeezing puck 120 at squeeze points 312 as shown in FIG. 3. Further details on a process for removing puck 120 and for further cleaning camera window 114 are shown in and described with respect to FIG. 4.

Figure 4:
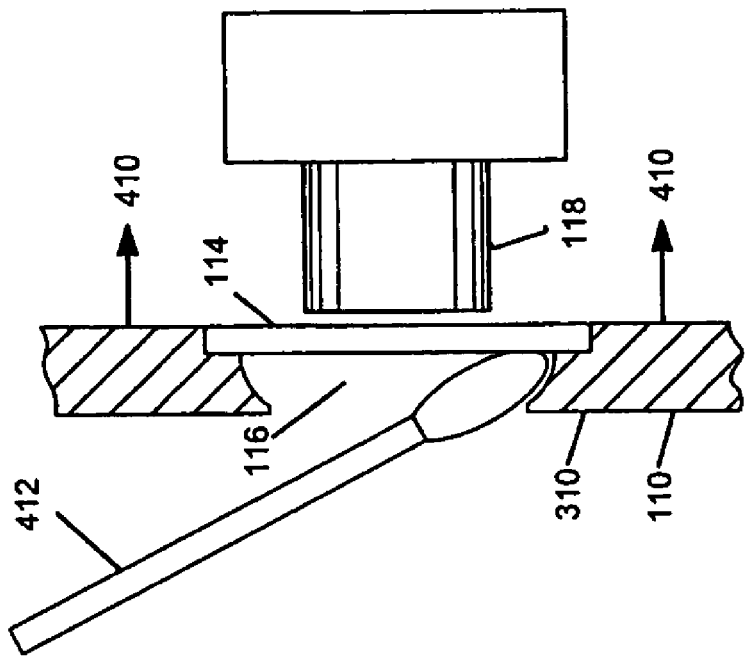
FIG. 4 is a side-cutaway view of an appliance having a camera window and shutter puck of FIG. 1 showing the cleaning of a camera lens in accordance with one or more embodiments.
Figure 4:
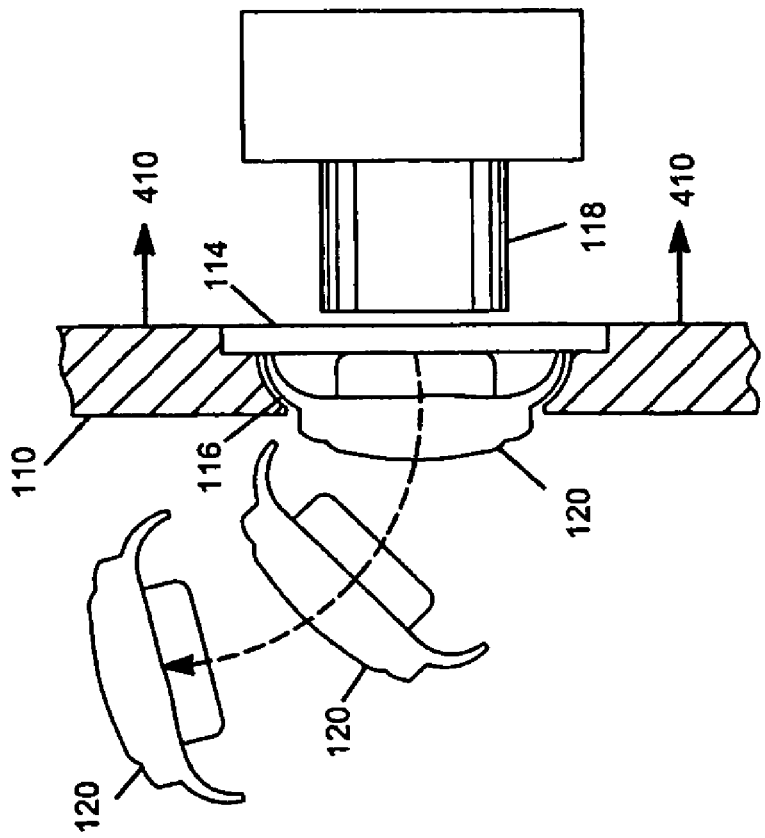

Referring now to FIG. 4, a side-cutaway view of an appliance having a camera window and shutter puck of FIG. 1 showing the cleaning of a camera lens in accordance with one or more embodiments will be discussed. As shown in FIG. 4, puck 120 may be removed, cleaned and/or replaced, for example, by reversing an installation process by which puck 120 was inserted into window slot 116. In one or more embodiments, puck 120 may be deformed by a two-finger squeezing operation by the squeezing of puck 120 at squeeze points 312 as shown in FIG. 3, to allow puck 120 to be extracted from window slot 116 by hand, for example, or with a tool as another example. Window slot 116 may be designed to allow access of a cleaning swab 412 or similar implement that may be utilized, optionally using a solvent, to clean window slot 116 and/or camera window 114. In one or more embodiments, a clean puck 120 may be inserted into to window slot 116 via an installation method in which puck 120 may be at least partially deformed by squeezing puck 120 at squeeze points 312. While deformed, puck 120 may be inserted into window slot 116 and then allowed to reform within window slot 116 so that puck 120 is retained within window slot 116. The design and/or arrangement of puck 120, pad 314, camera window 114 and/or window slot 116 as discussed herein are merely examples wherein various other designs and/or arrangements may be implemented, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a cleaning friendly camera privacy feature and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
   a housing having a camera window and a window slot disposed in said housing; and
   a puck capable of being disposed in the window slot, said puck being capable of being moved to a first position in the window slot to allow a camera to capture an image through the camera window, and being capable of being moved to a second position in the window slot to at least partially impede the camera from capturing an image through the camera window, the puck being at least partially deformable to allow said suck to be inserted into or extracted from the window slot;
   wherein movement of said puck in said slot is capable of cleaning the camera window.

2. An apparatus as claimed in claim 1, said puck further comprising a pad capable of cleaning the camera window as said puck is moved within the window slot.

3. An apparatus as claimed in claim 1, said puck further comprising a pad capable of cleaning the camera window as said puck is moved within the window slot, wherein the pad comprises a microfiber type material.

4. An apparatus as claimed in claim 1, said puck comprising a rubber, a plastic, or a polymer, or combinations thereof.

5. An apparatus as claimed in claim 1, said puck comprising a rib grip to allow a user to grasp said puck via the rib grip to facilitate movement of said puck within the window slot.

6. An apparatus as claimed in claim 1, said puck comprising squeeze points to facilitate a user to squeeze and at least partially deform said puck.

7. An apparatus, comprising:
   a housing having a camera window and a window slot disposed in said housing;
   a display disposed in said housing, said display being capable of displaying an image thereon;
   a camera disposed within said housing, said camera being capable of capturing an image through said camera window; and
   a puck capable of being disposed in the window slot, said puck being capable of being moved to a first position in the window slot to allow said camera to capture an image through the camera window, and being capable of being moved to a second position in the window slot to at least partially impede said camera from capturing an image through the camera window, the puck being at least partially deformable to allow said puck to be inserted into or extracted from the window slot;
   wherein movement of said puck in said slot is capable of cleaning the camera window.

8. An apparatus as claimed in claim 7, said puck further comprising a pad capable of cleaning the camera window as said puck is moved within the window slot.

9. An apparatus as claimed in claim 7, said puck further comprising a pad capable of cleaning the camera window as said puck is moved within the window slot, wherein the pad comprises a microfiber type material.

10. An apparatus as claimed in claim 7, said puck comprising a rubber, a plastic, or a polymer, or combinations thereof.

11. An apparatus as claimed in claim 7, said puck comprising a rib grip to allow a user to grasp said puck via the rib grip to facilitate movement of said puck within the window slot.

12. An apparatus as claimed in claim 7, said puck comprising squeeze points to facilitate a user to squeeze and at least partially deform said puck.

13. An apparatus as claimed in claim 8, the puck further comprising a pad capable of cleaning the camera window as the puck is moved within the window slot, wherein the pad comprises a microfiber type material.

14. An apparatus as claimed in claim 8, the puck comprising a rubber, a plastic, or a polymer, or combinations thereof.

15. An apparatus as claimed in claim 8, the puck comprising a rib grip to allow a user to grasp the puck via the rib grip to facilitate movement of the puck within the window slot.

16. An apparatus as claimed in claim 8, the puck comprising squeeze points to facilitate a user to squeeze and at least partially deform the puck.

17. An apparatus as claimed in claim 2, the puck further comprising a pad capable of cleaning the camera window as the puck is moved within the window slot, wherein the pad comprises a microfiber type material.

18. An apparatus as claimed in claim 2, said puck comprising a rubber, a plastic, or a polymer, or combinations thereof.

19. An apparatus as claimed in claim 2, the puck comprising a rib grip to allow a user to grasp the puck via the rib grip to facilitate movement of the puck within the window slot.

20. An apparatus, comprising:
   a housing having a camera window and a window slot disposed in the housing; and
   a puck capable of being disposed in the window slot, the puck being capable of being moved to a first position in the window slot to allow a camera to capture an image through the camera window, and being capable of being moved to a second position in the window slot to at least partially impede the camera from capturing an image through the camera window, and the puck comprising squeeze points to facilitate a user to squeeze and at least partially deform the puck;
   wherein movement of the puck in the slot is capable of cleaning the camera window.

\* \* \* \* \*